United States Patent [19]

Friesen et al.

[11] Patent Number: 5,611,842
[45] Date of Patent: Mar. 18, 1997

[54] ORGANIC AND INORGANIC VAPOR PERMEATION BY COUNTERCURRENT CONDENSABLE SWEEP

[75] Inventors: Dwayne T. Friesen; David D. Newbold; Scott B. McCray; Roderick J. Ray, all of Bend, Oreg.

[73] Assignee: Bend Research, Inc., Bend, Oreg.

[21] Appl. No.: 583,309

[22] Filed: Jan. 5, 1996

Related U.S. Application Data

[63] Continuation-in-part of Ser. No. 307,293, Sep. 14, 1994, abandoned.

[51] Int. Cl.[6] .................................................. B01D 53/22
[52] U.S. Cl. ........................... 95/50; 95/45; 95/47; 95/48; 95/49
[58] Field of Search ........................... 95/45, 48–52

[56] References Cited

U.S. PATENT DOCUMENTS

| | | | |
|---|---|---|---|
| 3,735,558 | 5/1973 | Skarstrom et al. | 95/51 |
| 4,466,202 | 8/1984 | Merten | 34/27 |
| 4,553,983 | 11/1985 | Baker | 95/50 |
| 4,718,921 | 1/1988 | Makino et al. | 95/52 |
| 4,834,779 | 5/1989 | Paganessi et al. | 95/51 X |
| 4,857,078 | 8/1989 | Watler | 95/50 |
| 4,929,357 | 5/1990 | Schucker | 95/50 X |
| 4,961,759 | 10/1990 | Taylor | 95/52 |
| 4,964,886 | 10/1990 | Brugerolle et al. | 95/51 |
| 4,978,430 | 12/1990 | Nakagawa et al. | 203/14 |
| 4,994,094 | 2/1991 | Behling et al. | 95/50 X |
| 5,002,590 | 3/1991 | Friesen et al. | 95/52 |
| 5,034,025 | 7/1991 | Overmann, III | 95/52 |
| 5,067,971 | 11/1991 | Bikson et al. | 95/52 |
| 5,084,073 | 1/1992 | Prasad | 95/52 |
| 5,089,033 | 2/1992 | Wijmans | 95/39 |
| 5,108,464 | 4/1992 | Friesen et al. | 95/52 |
| 5,116,396 | 5/1992 | Prasad et al. | 95/51 X |
| 5,118,328 | 6/1992 | Wnuk et al. | 95/50 |
| 5,226,932 | 7/1993 | Prasad | 95/52 |
| 5,236,474 | 8/1993 | Schofield et al. | 95/48 X |
| 5,259,869 | 11/1993 | Auvil et al. | 95/52 |
| 5,332,424 | 7/1994 | Rao et al. | 95/49 X |
| 5,354,547 | 10/1994 | Rao et al. | 95/45 X |
| 5,383,956 | 1/1995 | Prasad et al. | 95/45 |

FOREIGN PATENT DOCUMENTS

| | | | |
|---|---|---|---|
| 0430331 | 6/1991 | European Pat. Off. | 95/50 |
| 3726431 | 2/1989 | Germany | 95/50 |
| 1-070124 | 3/1989 | Japan | 95/52 |
| 3-169327 | 7/1991 | Japan | 95/50 |
| 5-177111 | 7/1993 | Japan | 95/52 |

*Primary Examiner*—Robert Spitzer
*Attorney, Agent, or Firm*—Chernoff, Vilhauer, McClung & Stenzel

[57] ABSTRACT

A process for the removal of at least one non-water vapor component of a vaporous mixture, the basic process comprising directing a vaporous mixture against the feed side of a membrane, directing a condensable vapor sweep stream past the permeate side of the membrane in a manner such that the flow of the condensable vapor sweep is substantially countercurrent to the flow of the vaporous mixture, thereby transporting at least a portion of at least one non-water vapor component of the vaporous mixture from the feed side to the permeate side of the membrane to form a combined permeate side mixture of condensable vapor and at least one non-water vapor transported component.

14 Claims, 7 Drawing Sheets

5,611,842

ORGANIC AND INORGANIC VAPOR PERMEATION BY COUNTERCURRENT CONDENSABLE SWEEP

This is a continuation-in-part of application Ser. No. 08/307,293 filed Sep. 14, 1994, now abandoned.

BACKGROUND OF THE INVENTION

Vapor permeation is a membrane-based process that can be used to separate mixtures of vapors. In an example of such a process, a vaporous mixture of water containing low concentrations of an organic is fed at essentially ambient pressure to the feed side of a membrane, while a vacuum pump or a gaseous sweep stream maintains a sufficiently low partial pressure of the organic on the permeate side of the membrane to provide a chemical potential gradient of the organic across the membrane. The organic and some of the water are transported to the permeate side of the membrane to form a vapor-phase permeate.

One problem commonly associated with vapor permeation is economically providing and maintaining the chemical potential gradient across the membrane. Those permeation processes employing a vacuum pump or condenser to provide the necessary chemical potential gradient are energy-intensive and thus expensive to operate. As the vapor feed stream passes along the length of the membrane, the concentration (and, therefore, the vapor pressure) of the vaporous component desired to be removed from the vaporous feed stream is reduced to low levels. Thus, to maintain a driving force for transport, the partial pressure of that component in the permeate stream must be kept even lower for permeation and therefore separation to take place. If a vacuum pump is used to maintain the difference in partial pressure of the permeated component in the vapor phase feed stream and the partial pressure of the component in the vapor phase permeate, the pump must maintain a very high vacuum, i.e., a very low absolute pressure, thus incurring high capital and operating costs. Similarly, if a condenser is used, extremely low temperatures must be maintained, requiring a costly and complicated refrigeration system.

Commonly-owned U.S. Pat. No. 5,236,474 discloses a membrane process for the removal of condensable water vapor from air by the countercurrent circulation of a cool extraction fluid such as liquid water at 8° C. on the permeate side of the membrane. The permeate-side cool extraction fluid acts as both a heat extraction fluid and an entrainment fluid that lowers the temperature of the vapor-containing feed gas in direct contact with the feed side of the membrane, thereby condensing vapor from the feed gas. Due to a total pressure differential driving force across the membrane, bulk flow of the liquid condensed vapor through the membrane takes place and the condensed vapor is entrained in the cool extraction fluid.

U.S. Pat. Nos. 4,466,202, 4,553,983, 4,857,078 and 5,089,033 all disclose membrane processes for the removal of organic vapors generally from non-condensable feed streams, but none of the processes uses or suggests the use of a sweep stream.

Thus, although the prior art has utilized a countercurrent cool extraction fluid in a permeation process for the removal of a condensable vapor such as water from a non-condensable feed stream such as air, there has been no recognition of the value of using a condensable countercurrent sweep in a process for the separation of the components of a feed containing a mixture of several vapors, the mixture being predominantly condensable, with both the feed and the permeate being maintained in a non-condensed state. The prior art has, in fact, generally taught away from the use of a condensable countercurrent sweep because the sweep has been thought to dilute the purity of the permeate stream with little or no benefit. Thus, it has not been recognized that the benefits of increased average permeate flux and increased average temperature obtained via the present invention more than offset any decrease in purity of the permeated component.

SUMMARY OF THE INVENTION

In its broadest aspect, the present invention comprises a process for the removal of at least one component of a vaporous mixture, comprising directing a non-condensed vaporous mixture against the feed side of a membrane, directing a condensable vapor sweep stream past the permeate side of the membrane in a manner such that the flow of the condensable vapor sweep is substantially countercurrent to the flow of the vaporous mixture, thereby transporting at least a portion of at least one component of the non-condensed vaporous mixture from the feed side to the permeate side of the membrane to form a combined non-condensed permeate side mixture of condensable vapor and at least one transported component, all the while maintaining across the membrane a partial pressure differential of the transported component(s). The combined permeate side mixture is then collected and the transported component recovered by separating the same from the combined permeate side mixture.

Vapor permeation performed in accordance with the present invention results in significantly higher permeate fluxes due to increased driving force, while maintaining the same or greater separation factor, and assists in maintaining the temperature of the feed stream sufficiently high. In addition, the use of a condensable vapor sweep stream allows the driving force for transport to be maintained without the need for high vacuum.

DETAILED DESCRIPTION

Figure 1:
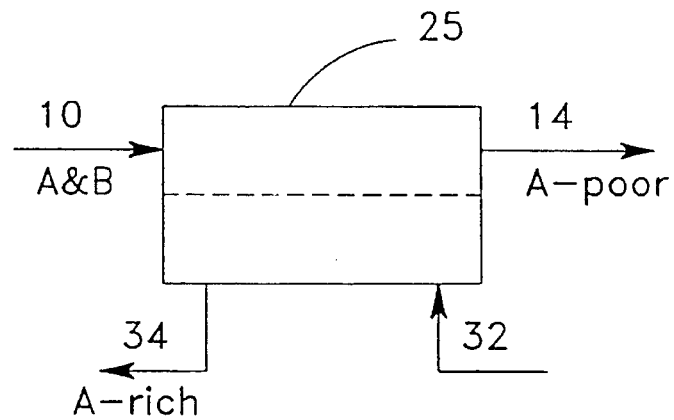
FIGS. 1–13 are schematic diagrams of exemplary systems for conducting the countercurrent condensable sweep vapor permeation process of the present invention.

Referring now to the drawings, wherein like elements are designated by the same numerals, FIG. 1 depicts a system wherein a vaporous, predominantly condensable feed stream 10 containing at least two vaporous condensable components A and B is fed to a membrane module 25 while maintaining the feed near saturation without condensing the same. Component A is a non-water vapor, such as an organic vapor like acetone, toluene or ethanol, and component B is a second vapor. In a typical separation, component A would be toluene vapor and component B would be water vapor. A condensable vapor sweep stream 32 is fed to the permeate side of the membrane module 25 at a vapor inlet port located near the retentate end of the module so as to flow countercurrent to the feed stream. The partial pressure of one of the non-water components of the feed stream (component A) is maintained at a partial pressure on the permeate side of the membrane that is less than the partial pressure of that same non-water component in the feed mixture on the feed side, creating a driving force which results in permeation of that component through the membrane to the permeate side, thereby selectively removing at least a portion of component A in the membrane module, producing a retentate stream 14 depleted in component A ("A-poor"). Condensable vapor sweep stream 3-2 mixes with non-condensed vaporous permeate enriched in component A ("A-rich") as it permeates the membrane of module 25, producing a combined non-condensed permeate side mixture 34 which exits from the module at a vapor outlet port located near the feed end of the module.

Figure 2:
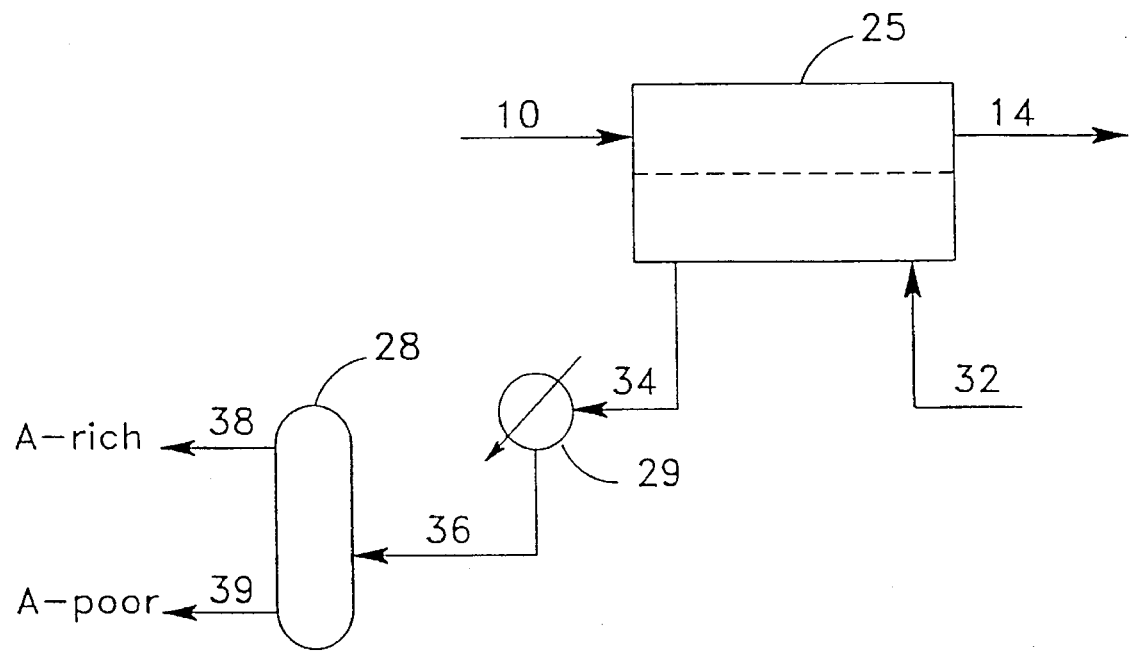

FIG. 2 depicts a system wherein a vaporous, predominantly condensable feed stream 10 containing at least two vaporous components is fed to a membrane module 25 while maintaining the feed near saturation without condensing the same. A condensable vapor sweep stream 32 is fed to the permeate side of the membrane module 25 at a vapor inlet port located near the retentate end of the module so as to flow countercurrent to the feed stream. By maintaining the partial pressure of one of the non-water vapor components of the feed stream (component A) higher on the feed side than on the permeate side, a driving force is created which results in permeation of at least a portion of component A through the membrane in a vaporous state to the permeate side, causing selective removal of component A in the membrane module, and producing a retentate stream 14 depleted in component A. Condensable vapor sweep stream 32 mixes with the vaporous permeate enriched in component A that permeates the membrane of module 25, producing a non-condensed combined permeate side mixture 34 which exits from the membrane module at a vapor outlet port located near the feed end of the module. Combined permeate side mixture 34 then enters a condenser 29, where the combined permeate side mixture is condensed to form condensed permeate 36. Condensed permeate 36 is directed to a separation apparatus 28, producing a stream 38 enriched in component A, and a stream 39 depleted in component A.

Figure 3:
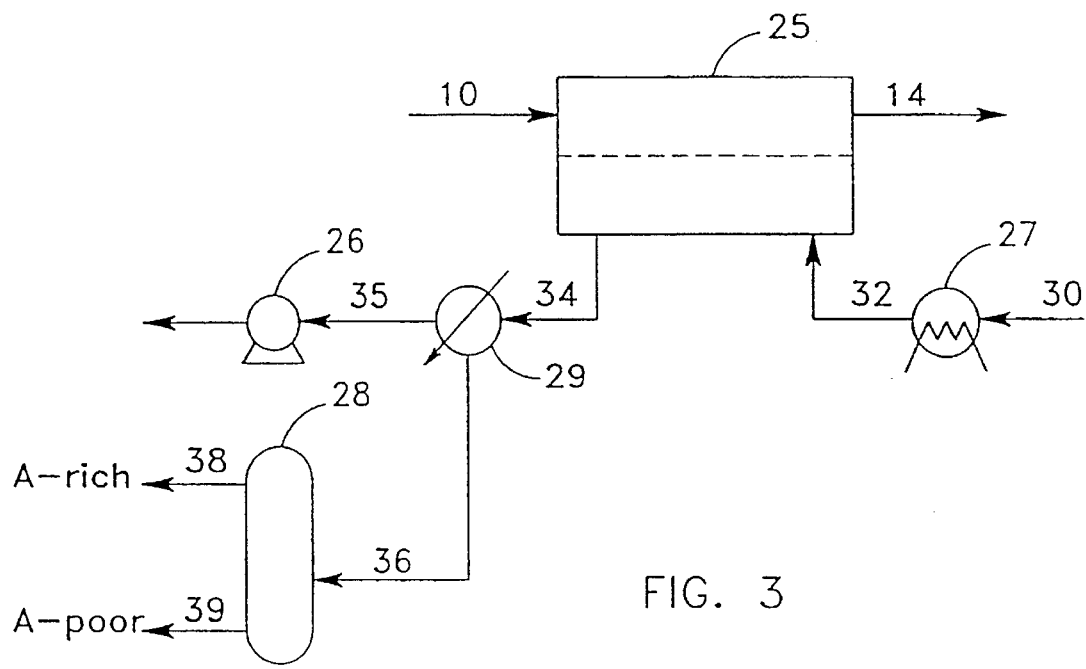

FIG. 3 is a schematic of a system that is essentially the same as the system depicted in FIG. 2, except that the condensable vapor sweep stream 32 is produced from a liquid stream 30 using a vapor generator 27. Additionally, FIG. 3 shows a stream of non-condensable components 35, which may have entered the system, exiting condenser 29. These non-condensable components are then removed using vacuum pump 26.

Figure 4:
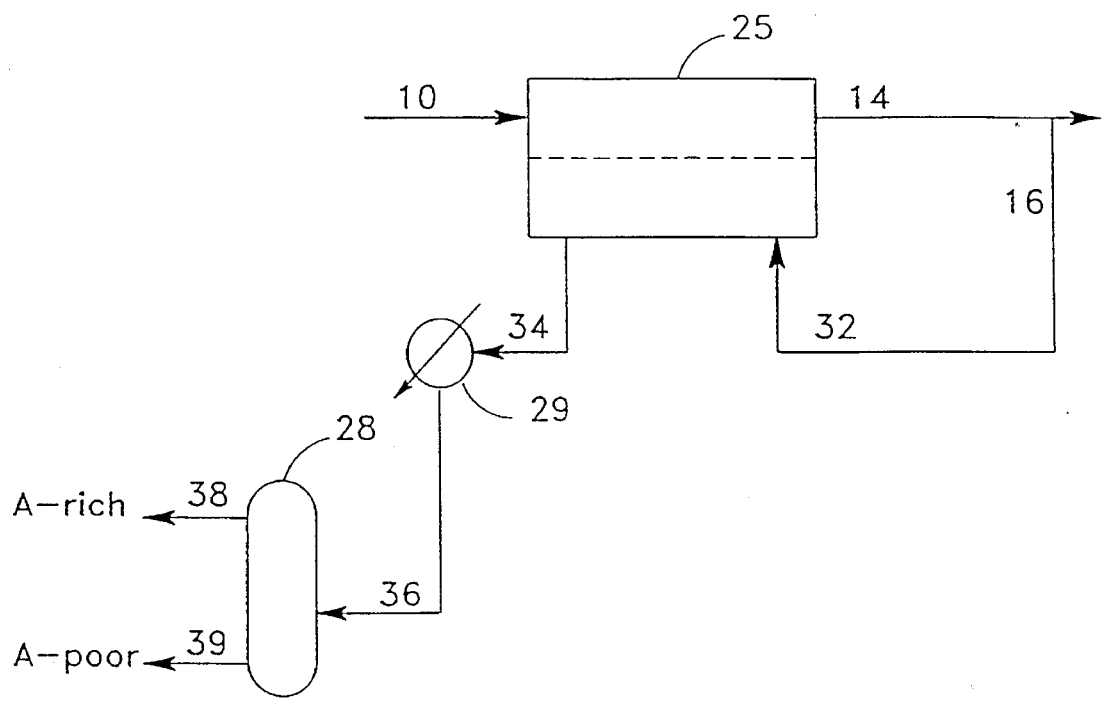

FIG. 4 is a schematic of a system that is also essentially the same as the system depicted in FIG. 2 except that a portion 16 of the depleted retentate stream 14 is used for the condensable vapor sweep stream 32.

Figure 5:
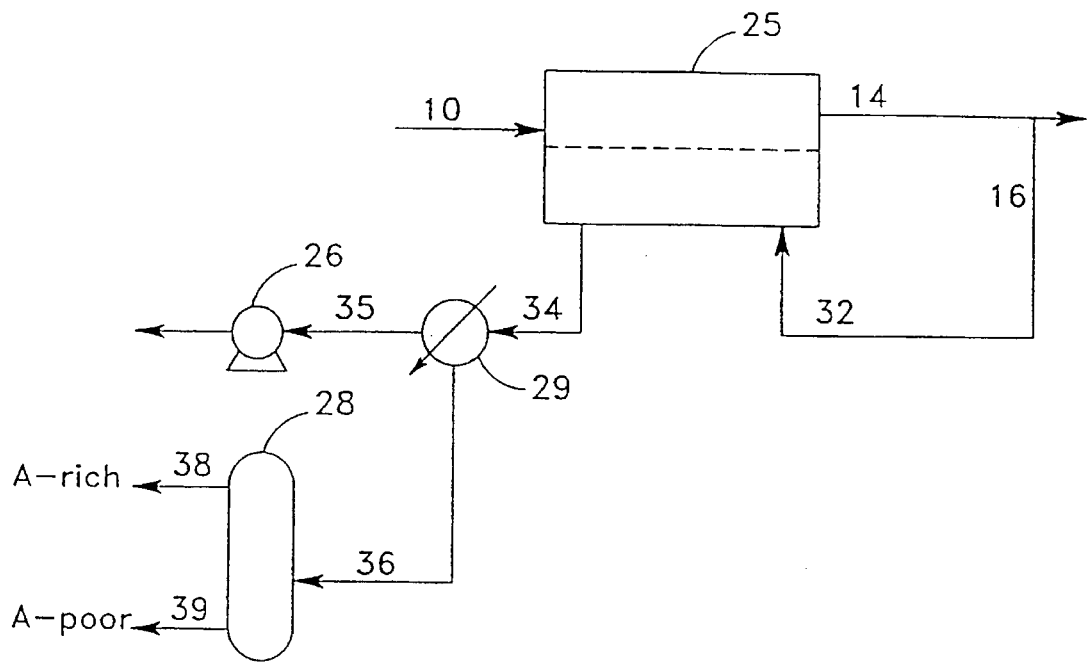

FIG. 5 is a schematic of a system that is essentially the same as the system depicted in FIG. 3 except that a portion 16 of the depleted retentate stream 14 is used for the condensable vapor sweep stream 32.

Figure 6:
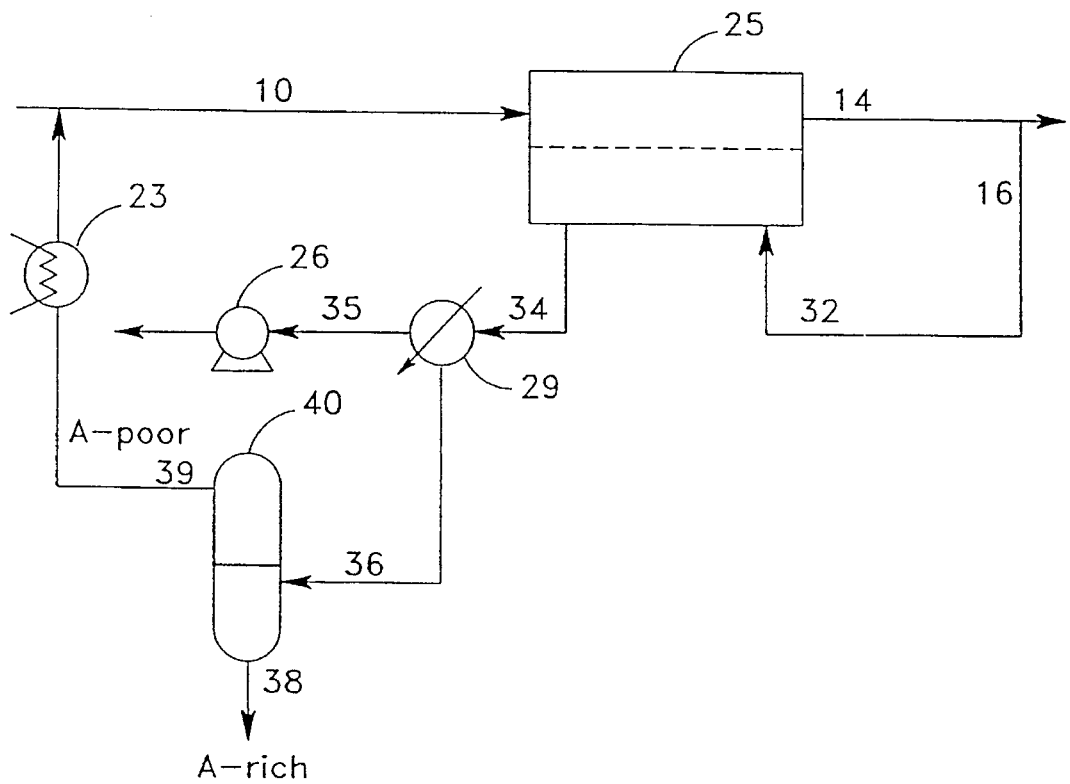

FIG. 6 depicts a system similar to the system depicted in FIG. 5 except that a decantation/phase separation apparatus 40 is specified as the separation apparatus. This embodiment is useful when component A is substantially immiscible with the compound used to form the condensable vapor sweep stream. The purified component A 38 is withdrawn from the decantation process, while the stream 39 depleted in component A is vaporized in vapor generator 23 and recycled to the feed stream 10.

Figure 7:
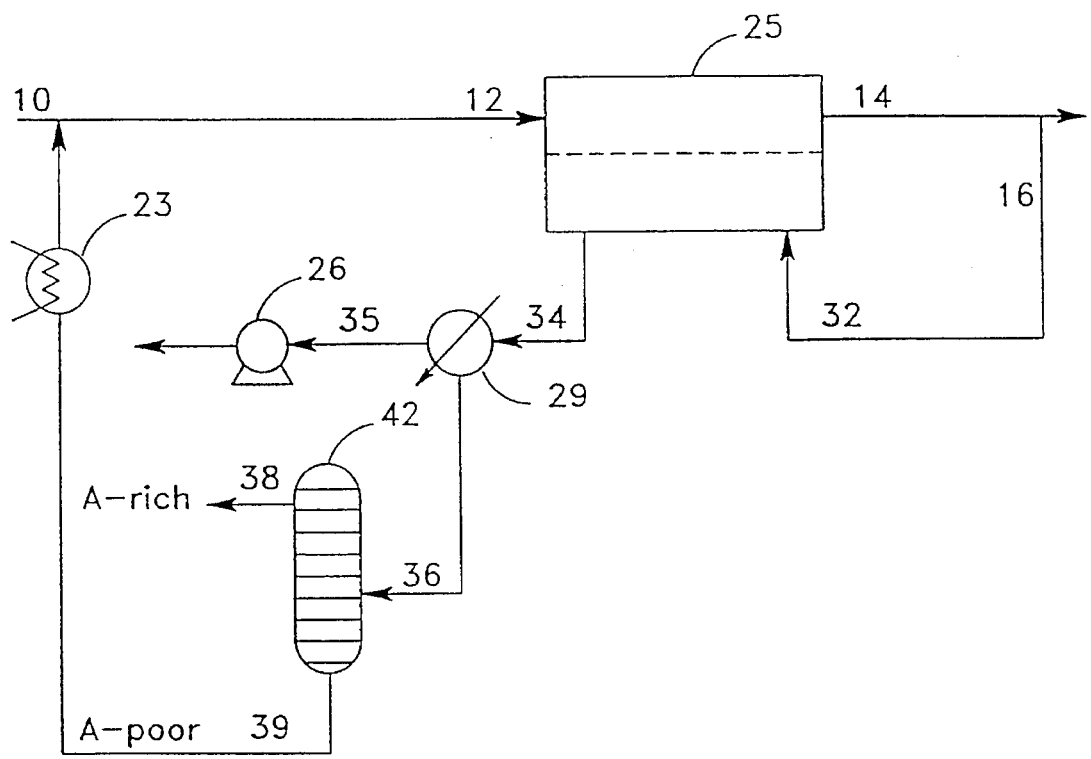

FIG. 7 shows a system similar to the system depicted in FIG. 5 except that a distillation/evaporation apparatus 42 is specified as the separation apparatus. This embodiment is useful when component A is substantially miscible with the liquid used to form the condensable vapor sweep stream. The purified component A 38 is removed from the distillation process, while the stream 39 depleted in component A is vaporized in vapor generator 23 and recycled to the feed stream.

Figure 8:
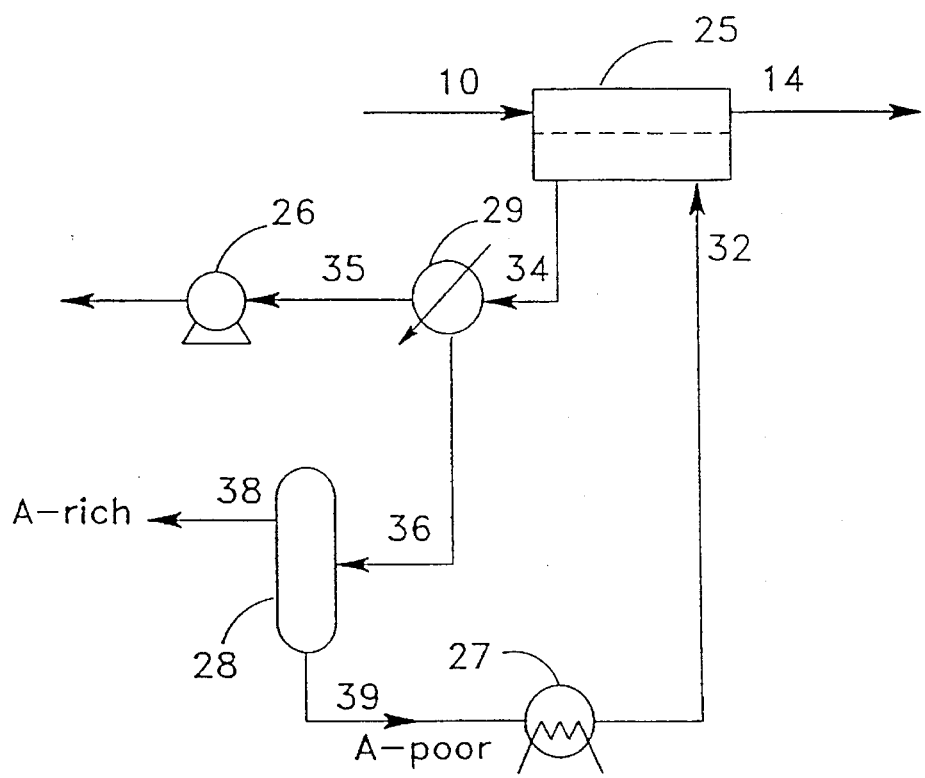

FIG. 8 depicts essentially the same system as shown in FIG. 3 except that stream 39 depleted in component A from separation apparatus 28 is directed to a vapor generator 27 to produce condensable vapor sweep stream 32.

Figure 9:
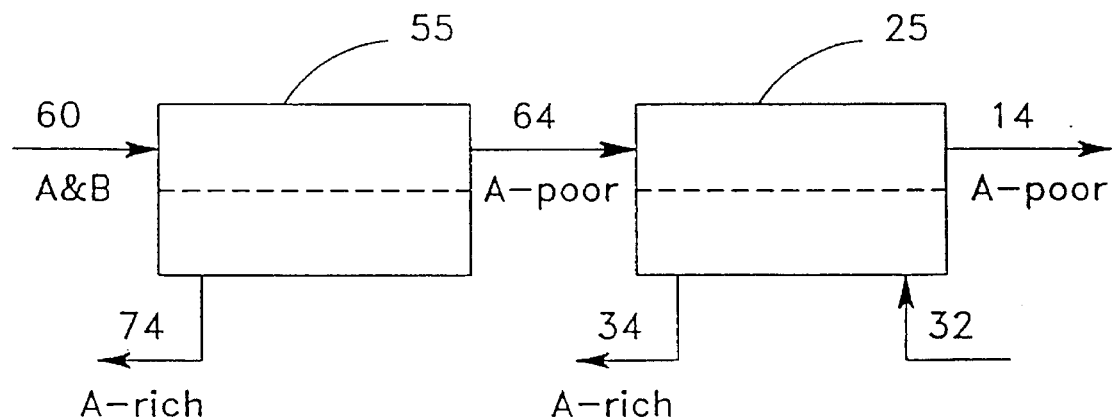

FIG. 9 depicts a system wherein a feed stream 60 containing at least two vaporous components is first fed to a conventional vapor permeation membrane module 55. One of the components of the feed stream (component A) is selectively removed in the module 55, producing a retentate stream 64 partially depleted in component A and a vaporous permeate stream 74 enriched in component A. The partially depleted retentate stream 64 is fed in a non-condensed vaporous state to a countercurrent condensable sweep membrane module 25 of the present invention. A condensable vapor sweep stream 32 is fed to the permeate side of module 25 at a vapor inlet port located near the retentate end of the module so as to flow countercurrent to the feed stream. Because of its partial pressure differential between the feed and permeate sides, component A is selectively removed in module 25, producing a retentate stream 14 depleted in component A. Condensable vapor sweep stream 32 mixes with the vaporous permeate enriched in component A as it permeates the membrane of module 25, producing a combined non-condensed permeate side mixture 34 which exits from module 25 at a vapor outlet port located near its feed end.

Figure 10:
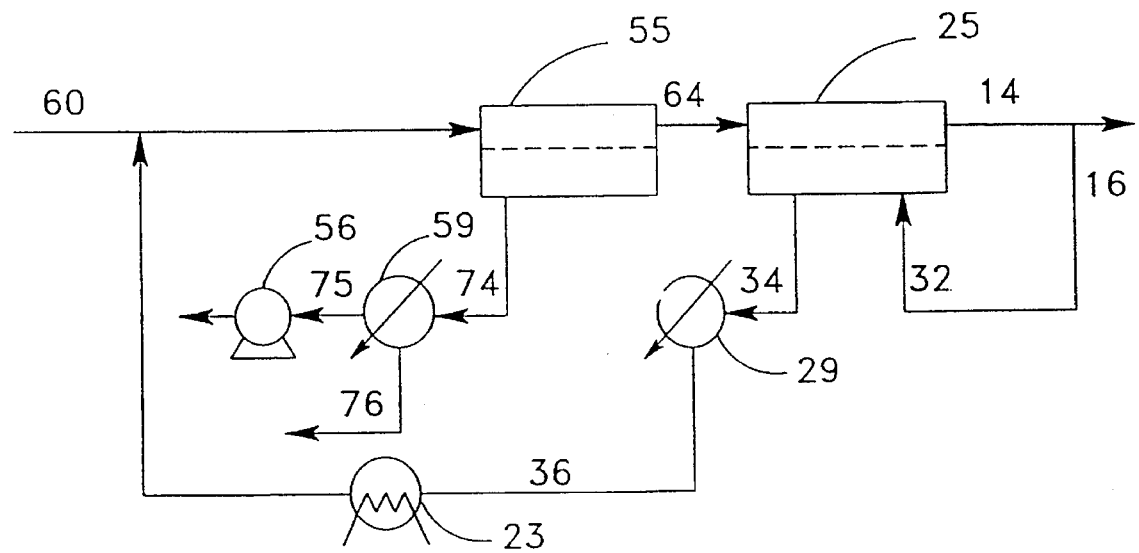

FIG. 10 is a schematic of a system that is essentially the same as that depicted in FIG. 9 except that the condensable vapor sweep stream 32 is produced from a portion 16 of the depleted retentate stream 14. Additionally, FIG. 10 shows the combined permeate side mixture 34 entering a condenser 29, where the combined permeate side mixture is condensed to form condensed permeate 36. The condensed permeate 36 is then vaporized in vapor generator 23 and recycled to the feed to the conventional vapor permeation module 55. FIG. 10 also shows the vaporous permeate stream 74 from the conventional pervaporation module 55 entering a condenser 59, producing a condensed permeate 76. FIG. 10 also includes a stream of non-condensable components 75, which may have entered the system, exiting condenser 59. These non-condensable components are then removed using a vacuum pump 56.

Figure 11:
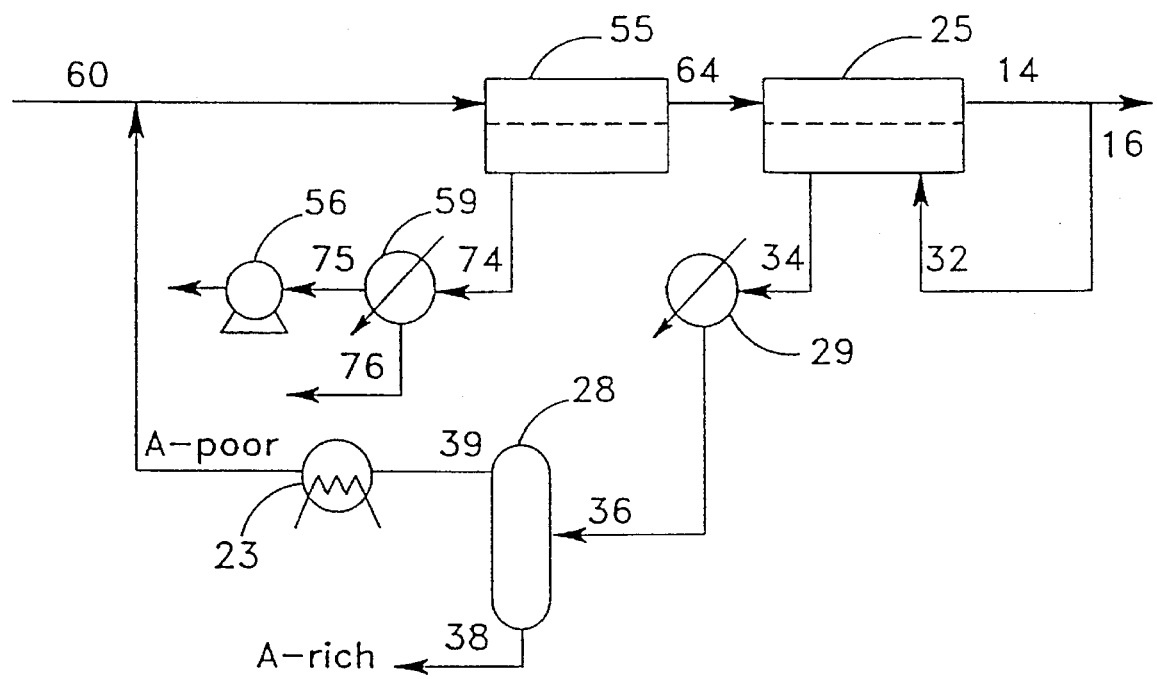

FIG. 11 is a schematic of a system that is essentially the same as that depicted in FIG. 10 except that the condensed permeate 36 is directed to a separation apparatus 28, producing a stream 38 enriched in component A, and a stream 39 depleted in component A, stream 39 then being vaporized and recycled to the feed to the conventional vapor permeation module 55.

Figure 12:
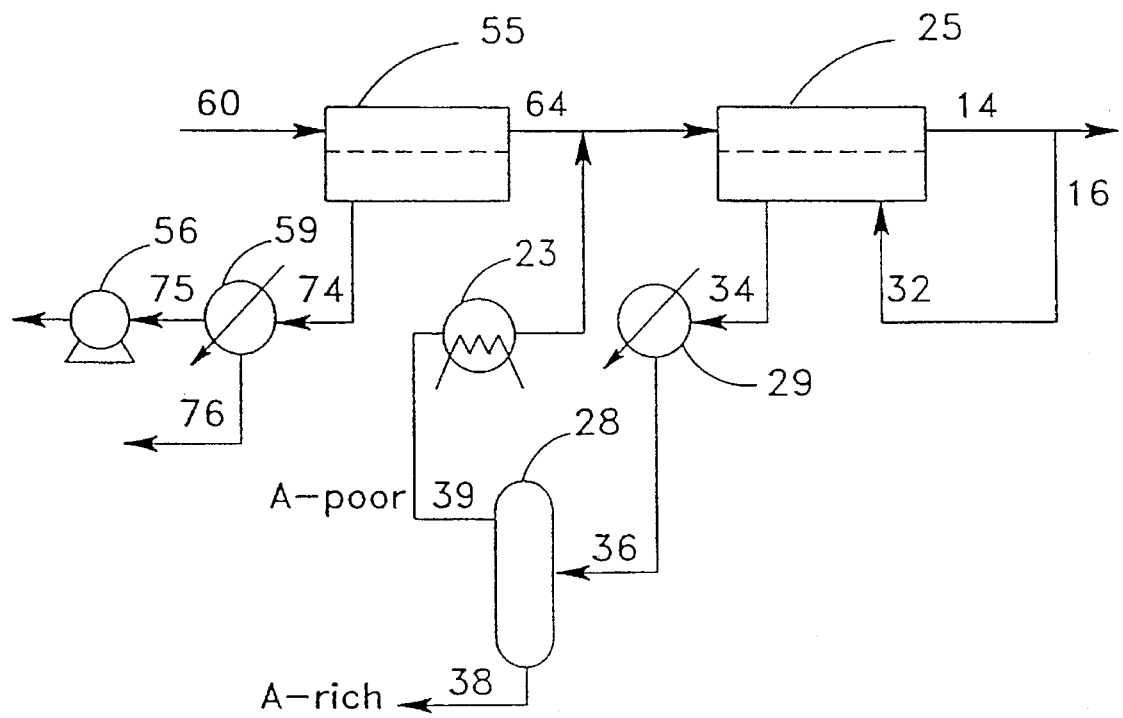

FIG. 12 is a schematic of a system that is essentially the same as the system depicted in FIG. 11 except that the stream 39 depleted in component A is vaporized and recycled to the feed to the countercurrent condensable sweep module 25.

Figure 13:
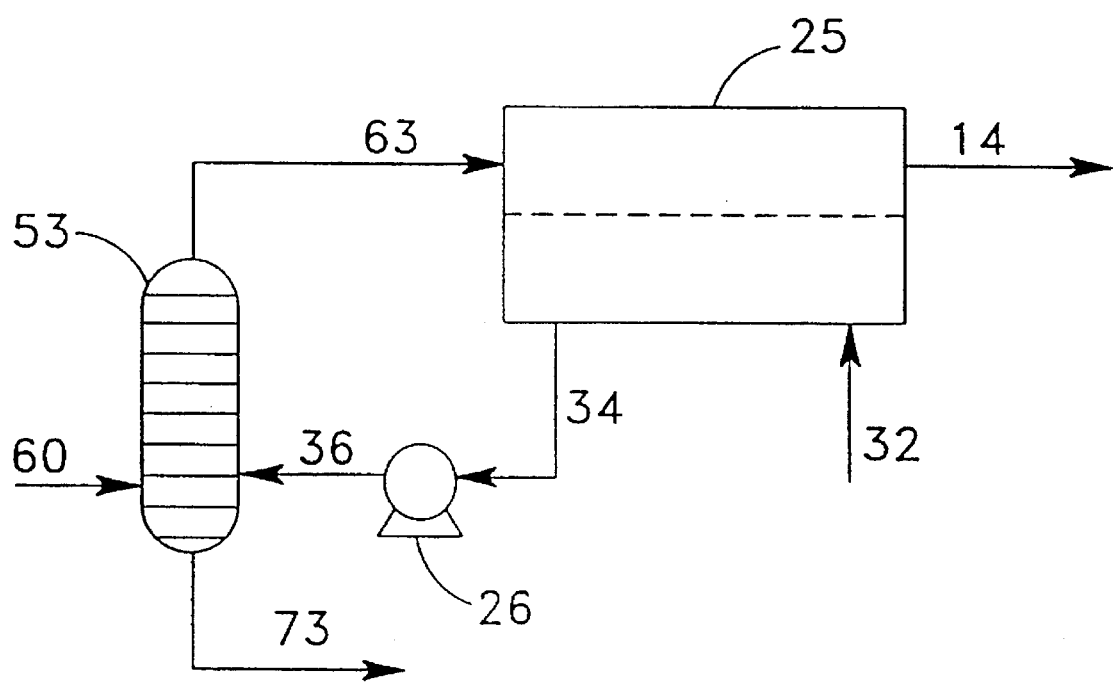

FIG. 13 depicts a system wherein a feed stream 60 containing at least two components is first fed to a distillation apparatus 53. One of the components of the feed stream (component A) is selectively removed by the distillation process, producing a bottoms stream 73 enriched in component A and a vaporous overhead stream 63 partially depleted in component A. The partially depleted vaporous overhead stream 63 is fed to a countercurrent condensable sweep membrane module 25 of the present invention. A condensable vapor sweep stream 32 is fed to the permeate side of module 25 at a vapor inlet port located near the retentate end of the module so as to flow countercurrent to the feed stream. Because of the partial pressure differential driving force, component A is selectively removed in module 25, producing a retentate stream 14 depleted in component A. Condensable vapor sweep stream 32 mixes with the vaporous permeate enriched in component A as it permeates the membrane of module 25, producing a combined non-condensed permeate side mixture 34 which exits from module 25 at a vapor outlet port located near its feed end. The combined permeate side mixture 34 enters a pump 26 which increases the pressure of the mixture to that of the distillation column, producing stream 36. Stream 36 is then recycled to the distillation apparatus 53.

The vaporous mixture comprising the feed stream to the membrane selected for the vapor permeation process may be a mixture of at least one non-water component with water, or a mixture of non-water components. This feed stream may derive from a variety of sources including, but not limited to, industrial process vent streams, the vaporous overhead from a distillation process, the overhead from a reflux process, vaporized liquids from industrial processes, vaporized industrial process vent streams, chemical process liquids, the production of fine chemicals, the production of pharmaceuticals, the recovery or purification of flavors and fragrances from natural products, or fermentation processes.

The separation to be achieved by the countercurrent sweep vapor permeation process of the present invention may be the removal of volatile compounds from water, or the separation of organic and inorganic vapor mixtures. Generally, the membrane used is selected such that the minor component of the feed stream is selectively removed by the membrane; however, the invention need not be so limited.

For the removal of volatile compounds from water, the volatile compound to be removed can be virtually any compound with sufficient volatility to be present in the vapor phase. Generally, this includes compounds with boiling points that are less than about 200° C. Examples of compounds that can be removed from water by the process of the present invention include, but are not limited to, chlorofluorocarbons such as Freons and Halons; chlorinated hydrocarbons, such as methylene chloride, trichloroethylene, trichloroethanes, carbon tetrachloride, chlorobenzene; non-chlorinated hydrophobic organics, such as benzene, toluene, xylene, ethyl benzene, cyclohexane, hexane and octane; nonchlorinated hydrophilic organics, such as methanol, ethanol, other alcohols, acetone, ethyl acetate, methyl ethyl ketone, methyl t-butyl ketone, other ketones, nitrobenzene, phenols, cresols, formic acid, acetic acid, other organic acids, amines, including triethylamine and pyridine, acetonitrile, dimethyl formamide, dimethylacetamide, and N-methylpyrrolidinone; and volatile inorganic compounds such as ammonia, bromine, iodine, sulfur dioxide and thionyl chloride.

For separation of organic mixtures, the mixtures may comprise various organic species. Organic mixtures that can be separated include, but are not limited to, methanol from other organic solvents, mixtures of isomers and components from natural extracts, olefins from paraffins, and aromatics from non-aromatics, such as the removal of benzene from gasoline or other hydrocarbons.

The membrane used in the process of the present invention can be virtually any material. For removal of volatile compounds from water, the membrane is usually, but not always, an elastomeric or rubbery polymer. Examples of materials useful for such separations include, but are not limited to, natural rubber, nitrile rubber, polystyrene-butadiene copolymers, poly(butadiene-acrylonitrile) rubber, polyurethanes, polyamides, polyacetylenes, poly(trimethylsilylpropyne), fluoroelastomers, poly(vinylchlorides), poly(phosphazenes), particularly those with organic substituents, halogenated polymers, such as poly(vinylidene fluoride) and poly(tetrafluoroethylene), and polysiloxanes, including silicone rubber. Ion-exchange membranes may also be used for some applications.

For separation of organic mixtures, the choice of membrane material will depend on the organics being separated. Many of the polymers listed above for removal of volatile compounds from water may work well for separating certain organic mixtures. In particular, it is often common to use copolymers for separating organics since the ratio of so-called "hard" and "soft" segments can easily be adjusted to provide the desired selectivity. Examples of other suitable membrane materials include poly(vinylalcohol), cellulosic materials, chitin and derivatives thereof, polyurethanes, polyamides, poly(acrylic acids), poly(acrylates), poly(vinyl acetates), and polyethers. Blends, copolymers and crosslinked versions of these materials are also useful.

Preferred membrane materials for separation of an inorganic vapor from an organic vapor will also depend on the identity of the compounds. For example, to separate a polar inorganic vapor from a relatively non-polar organic compound such as hexane, a polar material such as a poly(ether) or alkoxylated cellulose may be used.

The membrane may be isotropic or asymmetric. Additionally, the membrane may be homogeneous or a multilayer composite. In most cases, it is preferred that the membrane material be crosslinked to provide sufficient resistance to swelling or dissolution by the components in the feed stream. The membrane may be made by a solvent phase-inversion process, thermally induced phase-inversion process, melt-extrusion process, or by a wet or dry solvent-casting process. In the case of multilayer composites, the selective layer can be formed by dip-coating, painting, spray-coating, solution-coating, or by interfacial polymerization.

In multilayer composites, the support layers that provide mechanical strength to the composite (as opposed to the selective layer) should give as little resistance to the transport of the permeating species through the selective layer as is technically feasible. Additionally, the support membrane should be chemically and thermally resistant, allowing for operation on hot feed streams containing various chemical constituents. Materials suitable for the support membrane include, but are not limited to, organic polymers such as polypropylene, polyacrylonitrile, poly(vinylidenefluorides), poly(etherimides), polyimides, polysulfones, poly(ethersulfones), poly(arylsulfones), poly(phenylquinoxalines), polybenzimidazoles, and copolymers and blends of these materials; and inorganic materials such as porous glass, carbon, ceramics, and metals.

The membrane can be used in the form of a flat sheet or hollow fiber or tube. For flat-sheet membranes, the membrane may be placed into a module designed to permit countercurrent flow of the permeate stream relative to the feed stream. This can include plate-and-frame modules or spiral-wound modules. For hollow fibers and tubes, the feed flow may be on the outside (shell side) or inside (tube side) of the fibers. Especially preferred is a tube-side-feed hollow fiber module. The materials used in the membrane module should have sufficient chemical and thermal resistance to permit long-term operation.

In most applications, the vapor feed stream should be kept as close to saturation as possible without condensing the same. This is because the chemical potential of the species to be transported across the membrane is higher at saturation, leading to higher driving forces and correspondingly higher fluxes. Generally, it is desirable to operate such that the dry-bulb temperature of the feed stream is no more than 10° C. above the dew-point temperature of the feed stream, and more preferably no more than 5° C. above the dew-point temperature.

The process of the present invention is particularly useful for applications where each of the partial pressures of the more permeable components present in the vaporous feed stream prior to exiting the module (i.e., at the retentate end of the module) is less than about 0.1 atm. This is because as the more permeable component is removed from the feed stream, its partial pressure decreases, reducing the driving force for transport across the membrane. By using a countercurrent condensable sweep stream according to the process of the present invention, the driving force for transport is maintained without any need to reduce the total pressure of the permeate stream to a value less than that of each component. Although the process of the present invention will be effective for treating feed streams wherein the partial pressure of the more-permeable component is greater than 0.1 atm, the advantages over conventional vapor permeation processes are not as great due to the higher driving force present with the higher partial pressure.

Virtually any condensable vapor may be used as a countercurrent sweep stream. By condensable vapor is meant any compound with a boiling point greater than about −100° C. The condensable vapor may consist of one of the components of the vaporous feed solution or it may be a compound that is not present in the feed solution. The condensable vapor may be either miscible or substantially immiscible with at least one component of the feed mixture.

In one embodiment of the process of the present invention, the condensable vapor consists of one of the components of the feed solution that is not desired to be transported to the permeate side of the membrane. In this case, a portion of the retentate stream may be used to generate the condensable vapor used as the countercurrent sweep stream. For removing volatiles from water, water vapor or steam has been found to be particularly effective.

The volumetric flow of the condensable vapor at the vapor inlet port may be adjusted to provide the desired efficiency. Preferably, the volumetric flow of the condensable vapor is sufficient to reduce the partial pressure of the more permeable component on the permeate side of the membrane at the retentate end of the module below about one-half or less the value on the feed side of the membrane at the retentate end.

The permeate-side mixture may be collected, then directed to a separation apparatus in its non-condensed vaporous state. Examples of suitable separation means include, but are not limited to, distillation, fractional condensation, adsorption, absorption, or by another vapor permeation process.

Alternatively, the permeate side mixture may be collected by freezing or condensing the mixture, after which the transported component may be separated. This separation step may be performed by the most convenient method, such as by decantation, distillation, liquid/liquid extraction, evaporation, crystallization, freezing, adsorption, absorption, by extraction using a membrane contactor, or by a pervaporation process.

The process of the present invention may be used to perform the entire separation desired, or it may be combined with other processes in so-called "hybrid" systems. For example, a distillation process can be used to remove the bulk of one component from a feed stream, reducing the concentration such that the partial pressure of the component in the vapor phase overhead of the distillation process is less than about 0.1 atm. The countercurrent condensable sweep vapor permeation process of the present invention can then be used to reduce the concentration down to the desired level. The exact level to which the component is removed by the first separation process prior to removal by the countercurrent condensable sweep vapor permeation process is determined by the relative convenience and cost of the two processes.

In some cases, various streams from the hybrid process may be recycled to other points within the process to improve efficiency, to improve the quality of the separation, or to reduce operating costs. For example, in the hybrid system shown in FIG. 13, the condensed permeate side mixture 36 is recycled back to the distillation process. This option is particularly attractive when the concentration of the component being removed from the feed stream (component A) in the condensed permeate-side mixture from the countercurrent vapor permeation process 36 is close to the concentration of component A in the initial feed stream 60.

Many other hybrid systems can be envisioned that incorporate the countercurrent vapor permeation process of the present invention. One reasonably skilled in the arts of membrane systems and chemical engineering will readily appreciate that through the use of the appropriate separation process and the proper use of recycle streams, highly efficient, low-cost processes can be developed.

EXAMPLE 1

Utilizing a system of substantially the same configuration as shown in FIG. 3, a liquid solution of 670 ppm benzene in hexane was vaporized to form a vaporous feed solution 10 at a dry-bulb temperature of 90° C. and essentially ambient pressure. This solution was fed at a rate of 3.0 g/min to the lumens of hollow fiber membranes in module 25. The module 25 comprised composite hollow fibers with inside diameters of 360 μm. The effective length of the fibers was 38 cm. The inside surfaces of the hollow fibers were coated with a selective layer of crosslinked polymer of poly(dimethylsiloxane) (PDMS). The module had an effective membrane area of 166 cm$^2$.

A condensable sweep stream 32 comprising 100% hexane at 90° C. and 0.1 atm was introduced to the permeate side of the membrane at a vapor inlet port located near the retentate end of the module so as to flow substantially countercurrent to the flow of the feed. The flow rate of the hexane vapor sweep was set at 0.2 g/min.

A combined permeate side mixture 34 that comprised the condensable vapor sweep stream and the benzene that selectively permeated the membrane was withdrawn from a vapor outlet port located near the feed end of the module. The combined permeate side mixture 34 was sent to a condenser 29 cooled with a dry ice/isopropyl alcohol (IPA) solution to a temperature of approximately −75° C. A vacuum pump 26 was used to remove any non-condensable components that may have entered the system, thus maintaining a permeate pressure of approximately 0.1 atm.

Under the operating conditions described, the benzene flux through the membrane module was 0.17 kg/m$^2$-day.

COMPARATIVE EXAMPLE 1

For comparison, the system described in Example 1 was operated as a conventional vapor permeation system, that is, with a vacuum on the permeate side but with the countercurrent condensable sweep flow set to 0 so that no hexane was introduced as a condensable vapor sweep stream to the membrane module. In this experiment, the feed solution comprised 670 ppm benzene in hexane and the permeate pressure was set at 0.2 atm. The results of this comparative run and those of Example 1 are summarized in Table 1.

TABLE 1

| Example | Sweep Rate (g/min) | Benzene Flux (kg/m²-day) |
|---|---|---|
| 1 | 0.2 | 0.17 |
| Comp. Ex. 1 | 0 | 0.13 |

As is apparent from Table 1, when using a countercurrent condensable vapor sweep stream, the benzene flux was 30% greater than that obtained using a conventional system. This demonstrates that the use of a countercurrent condensable vapor sweep stream requires significantly lower membrane surface area for the separation due to the higher flux. Reduced membrane surface area leads to reduced separation system capital costs.

EXAMPLE 2

A computerized mathematical model of a system of the type shown in FIG. 6 was prepared and utilized to predict performance of the system utilizing different parameters. A liquid stream comprising 500 ppm toluene in water is vaporized to produce a vaporous feed stream. This stream is treated with a system substantially the same as depicted in FIG. 6. A membrane module containing 1 m² of a composite silicone rubber/polysulfone support membrane is used having a selectivity of 200 for toluene over water. A portion of the retentate stream equal to 10% of the feed stream flow rate is used as a countercurrent condensable vapor sweep stream. The pressure of the permeate is set to 0.02 atm. The flow rate to the module is adjusted so that the retentate stream flow rate is 1.85 kg/day, and the retentate stream contains 5 ppm toluene by weight. This represents a 99% reduction in toluene concentration. The combined permeate side mixture has a concentration of 2100 ppm toluene. The permeate side mixture is condensed and sent to a phase separator, where a toluene-rich phase is recovered. The toluene-poor phase, containing about 600 ppm toluene, is vaporized and mixed with the vaporous feed stream and sent to the module.

COMPARATIVE EXAMPLE 2

For comparison, the system described in Example 2 is operated as a conventional vapor permeation system, that is, with the countercurrent condensable sweep flow set to 0 so that no retentate is introduced as a condensable vapor sweep stream to the membrane module. Under these conditions, to produce a retentate containing 5 ppm toluene, the retentate flow is constrained to only 1.58 kg/day. These data demonstrate that by using a countercurrent condensable sweep stream, 17% more feed solution can be processed than that processed using a conventional vapor permeation process.

EXAMPLES 3–5

The system described in Example 2 is operated, except that the flow rate of the countercurrent condensable sweep stream is varied as noted in Table 2.

TABLE 2

| Example | Sweep Rate (% of Feed Flow) | Retentate Flow (kg/day) |
|---|---|---|
| Comp. Ex. 2 | 0 | 1.58 |
| 2 | 1 | 1.64 |
| 3 | 10 | 1.85 |
| 4 | 20 | 1.92 |
| 5 | 50 | 1.98 |

COMPARATIVE EXAMPLE 3

An important class of separations in the chemical process industry is the separation of aromatic compounds from aliphatic compounds. One such separation is the removal of aromatics (such as benzene) from gasoline at a petrochemical plant. Acharya et al., in 37 *JMS* 205 (1988), describes a blend membrane of cellulose acetate with poly(bromophenylene oxide dimethylphosphonate ester) that has a selectivity for benzene over cyclohexane of 20. Assuming the use of this membrane and assuming a benzene permeability of 15 kg/m²-day-atm, the computer model described in Example 2 was used to evaluate the membrane for the removal of benzene from gasoline by conventional vapor permeation. The feed gasoline was assumed to contain 5% benzene, and the degree of separation attained was assumed to result in the production of a retentate stream containing 1% benzene. Assuming a feed pressure of 1.1 atm and a permeate pressure of 0.03 atm, such a membrane system containing 500 m² of the membrane will produce 8143 kg/day of benzene-depleted gasoline.

EXAMPLES 6–10

The same system described in Comparative Example 3 is used except with a countercurrent condensable sweep. Here, a portion of the retentate varying from 0.1 to 10% of the feed flow is introduced as sweep vapor, and the flow rate of the sweep vapor is varied. As shown in Table 3, by using a countercurrent condensable sweep, the amount of gasoline produced by the same membrane area (500 m²) increases as the amount of sweep used is increased, thus leading to lower costs for removing benzene from gasoline.

TABLE 3

| Example | Sweep Rate (% Feed Flow) | Retentate Flow (kg/day) | Increase in Flow (%) |
|---|---|---|---|
| Comp. Ex. 3 | 0 | 8,143 | — |
| 6 | 0.1 | 8,250 | 1.4 |
| 7 | 1 | 8,923 | 9.5 |
| 8 | 2 | 9,375 | 15 |
| 9 | 5 | 10,084 | 23 |
| 10 | 10 | 10,612 | 30 |

COMPARATIVE EXAMPLE 4

Another industrially important separation is that of pure propylene from a mixture of that gas with propane. In typical commercial applications, a process gas stream containing about 12% propylene in propane is produced. It is commercially desirable to not only recover the propylene from this stream, but to produce a propane product stream at the same time. From a purity standpoint that is acceptable in the industry, the concentration of propylene in the propane product stream cannot exceed 5%, and so a representative separation would be one wherein the concentration of propylene in the process gas stream is decreased from 12% to 5%.

Ito and Hwang, in 38 *J. Appl. Polym. Sci.,* 483 (1989), describe an ethyl cellulose membrane that has a selectivity for propylene over propane of 6. Assuming the permeability of this membrane to be 50 kg/m$^2$-day-atm, and using the same computer model as in Comparative Example 3, a conventional vapor permeation process for reducing the propylene concentration of a propane stream from 12% to 5% was evaluated. Assuming the feed pressure to be 33 atm and the permeate pressure 5 atm, and further assuming the production of 10,000 kg/day of propane containing 5% propylene, such a conventional system would have a propylene flux of 162 kg/m$^2$-day.

EXAMPLES 11 to 15

The system described in Comparative Example 4 is used to treat the same feed stream, except with a countercurrent condensable vapor sweep. Here, a portion of the retentate stream varying from 0.1 to 10% of the feed flow containing 5% propylene in propane is used as the sweep. Table 4 shows that as the flow rate of the vapor sweep in increased, the flux of propylene increases, requiring less membrane area and correspondingly lower costs for performing the same separation.

TABLE 4

| Example | Sweep Rate (% of Feed Flow) | Sweep Rate (% of Combined Permeate Flow Rate) | Propylene Flux (kg/m$^2$-day) | Increase in Flux (%) |
|---|---|---|---|---|
| Comp. Ex. 4 | 0 | 0 | 162 | — |
| 11 | 0.1 | 0.5 | 163 | 0.6 |
| 12 | 1 | 5.1 | 173 | 6.8 |
| 13 | 2 | 10.0 | 182 | 12.4 |
| 14 | 5 | 23.2 | 205 | 27 |
| 15 | 10 | 38.9 | 230 | 42 |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A countercurrent sweep vapor permeation process for the removal of at least one non-water vapor component of a vaporous mixture feed, said vaporous mixture feed consisting essentially of vapors and being predominantly condensable and including at least one non-water vapor component, comprising the steps of:

(a) providing a membrane that has a feed side and a permeate side and is selectively permeable to said at least one non-water vapor component;

(b) directing said vaporous mixture feed against said feed side of said membrane while maintaining said vaporous mixture feed near saturation without condensing the same;

(c) directing a sweep stream of condensable vapor past said permeate side of said membrane in a manner such that the flow of said sweep stream is substantially countercurrent to the flow of said vaporous mixture feed, thereby forming a retentate stream of non-permeating components and transporting at least a portion of said at least one non-water vapor component of said vaporous mixture feed from said feed side to said permeate side of said membrane to form a combined non-condensed permeate side mixture of said condensable vapor and said at least one non-water vapor component; and (d) removing said combined permeate side mixture wherein the partial pressure of said at least one non-water vapor component in said vaporous mixture feed exceeds the partial pressure of said at least one non-water vapor component on said permeate side.

2. The process of claim 1 wherein the dry bulb temperature of said vaporous mixture feed is $\leq 10°$ C. greater than its dew-point temperature.

3. The process of claim 1 wherein the dry bulb temperature of said vaporous mixture feed is $\leq 5°$ C. greater than its dew-point temperature.

4. The process of claim 1 wherein said vaporous mixture feed is selected from a mixture of at least one organic component with water, a mixture of organic compounds, an azeotropic mixture, a stream from a prior separation step, and a vaporized retentate stream from a prior pervaporation step; and wherein said condensable vapor of step (c) is selected from steam, an organic compound vapor, and a portion of the retentate stream from said countercurrent sweep vapor permeation process.

5. The process of claim 1, including an additional step (e) of separating said at least one non-water vapor component from said combined permeate side mixture, wherein said step (e) is conducted by a method selected from decantation; distillation; liquid/liquid extraction; evaporation; extraction using a membrane contactor; a pervaporation process; crystallization; freezing; adsorption; absorption; permeation through a selectively vapor-permeable membrane; fractional condensation; and producing a stream enriched in said at least one non-water vapor component and a stream depleted in said at least one non-water vapor component.

6. The process of claim 5 wherein said combined permeate side mixture is at least partially condensed prior to step (e).

7. The process of claim 1 wherein said sweep stream of condensable vapor of step (c) is produced from at least a portion of said stream depleted in said at least one non-water vapor component.

8. The process of claim 1 wherein said sweep stream of condensable vapor of step (c) is produced from a portion of the retentate stream from said countercurrent sweep vapor permeation process.

9. The process of claim 1 wherein said sweep stream of condensable vapor of step (c) is the vapor of a component of said vaporous mixture feed other than said at least one non-water vapor component.

10. The process of claim 1 wherein said vaporous mixture feed comprises the vaporous overhead from a distillation process.

11. The process of claim 10 wherein said combined permeate side mixture of step (c) is either recycled directly to said distillation process or is condensed prior to recycling to said distillation process.

12. The process of claim 1 wherein said combined permeate side mixture of step (c) is condensed to form a condensed permeate, and at least a portion of said condensed permeate is recycled to the feed side of the membrane of a prior membrane pervaporation step.

13. The process of claim 1 wherein said combined permeate side mixture of step (c) is condensed and is separated into a portion (1) rich in said at least one non-water vapor component and a portion (2) poor in said at least one non-water vapor component, and said portion (2) is recycled to said feed side of said membrane of said countercurrent sweep vapor permeation process.

14. The process of claim 1 wherein said membrane of step (a) has a permeate side vapor inlet port and a permeate side vapor outlet port, and the volumetric flow of said sweep stream of condensable vapor at said vapor inlet port is at least 0.5% of the volumetric flow of said combined permeate side mixture at said vapor outlet port.

* * * * *

UNITED STATES PATENT AND TRADEMARK OFFICE
CERTIFICATE OF CORRECTION

PATENT NO. : 5,611,842
DATED : March 18, 1997
INVENTOR(S) : Friesen, Newbold, McCray and Ray It is certified that error appears in the above-identified patent and that said Letters Patent is hereby corrected as shown below:

Col. 3, line 4: Delete [3-2] and insert --32--

Signed and Sealed this

Sixteenth Day of January, 2001

Attest:

Q. TODD DICKINSON

*Attesting Officer*  *Commissioner of Patents and Trademarks*